(12) United States Patent
Sato et al.

(10) Patent No.: US 9,856,147 B2
(45) Date of Patent: Jan. 2, 2018

(54) CERAMIC MATERIAL, METHOD FOR MANUFACTURING THE SAME, AND SEMICONDUCTOR MANUFACTURING APPARATUS MEMBER

(71) Applicant: NGK INSULATORS, LTD., Nagoya (JP)

(72) Inventors: Yosuke Sato, Hashima-Gun (JP); Katsuhiro Inoue, Ama-Gun (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/215,884

(22) Filed: Jul. 21, 2016

(65) Prior Publication Data
US 2017/0029286 A1    Feb. 2, 2017

(30) Foreign Application Priority Data

Jul. 29, 2015 (JP) .................. 2015-149314

(51) Int. Cl.
*C04B 35/04* (2006.01)
*C01F 17/00* (2006.01)
*C04B 35/50* (2006.01)
*C04B 35/505* (2006.01)
*C04B 35/622* (2006.01)

(52) U.S. Cl.
CPC .......... *C01F 17/0018* (2013.01); *C04B 35/50* (2013.01); *C04B 35/505* (2013.01); *C04B 35/62222* (2013.01); *C04B 2235/3213* (2013.01); *C04B 2235/3224* (2013.01); *C04B 2235/3225* (2013.01)

(58) Field of Classification Search
CPC ..... C04B 35/04; C04B 35/057; C04B 35/453; C04B 35/50; C04B 35/505
See application file for complete search history.

(56) References Cited

U.S. PATENT DOCUMENTS

| | | | | |
|---|---|---|---|---|
| 5,111,108 A * | 5/1992 | Goodman | ........... | H01J 61/0737 252/519.1 |
| 5,258,687 A * | 11/1993 | Duggan | ................... | H01J 1/14 313/344 |
| 6,828,588 B2 * | 12/2004 | Sakurai | .................. | C03C 17/22 257/79 |
| 7,622,411 B2 * | 11/2009 | Akiyama | ................ | C04B 35/01 106/286.2 |

(Continued)

FOREIGN PATENT DOCUMENTS

WO    2011/122376 A1    10/2011

*Primary Examiner* — Noah Wiese
(74) *Attorney, Agent, or Firm* — Burr & Brown, PLLC (57) ABSTRACT

The ceramic material of the present invention contains a crystalline phase of a complex oxide containing a Group II element M and a rare earth element RE. The Group II element M is Sr, Ca, or Ba. An XRD diagram of the ceramic material shows a first new peak between peaks derived from the (040) plane and the (320) plane of $MRE_2O_4$. Such a ceramic material may be manufactured by, for example, preparing a material containing $MRE_2O_4$ or a material capable of reacting in thermal spray flame to produce $MRE_2O_4$ as a thermal spray material, and thermally spraying the thermal spray material onto a predetermined object.

10 Claims, 7 Drawing Sheets (56) References Cited

U.S. PATENT DOCUMENTS

2009/0016409 A1\* 1/2009 Mizoguchi ........... C01G 45/125
  374/185
2013/0022526 A1\* 1/2013 Watanabe ............... C04B 35/44
  423/263

\* cited by examiner

CERAMIC MATERIAL, METHOD FOR MANUFACTURING THE SAME, AND SEMICONDUCTOR MANUFACTURING APPARATUS MEMBER

BACKGROUND OF THE INVENTION

1. Field of the invention

The present invention relates to a ceramic material, a method for manufacturing the same, and a semiconductor manufacturing apparatus member.

2. Description of the Related Art

In semiconductor manufacturing apparatuses used in dry processes or for plasma coating in manufacture of semiconductors, highly reactive Cl-based plasma or the like is used for etching or cleaning. Accordingly, the members of these apparatus are required to be resistant to corrosion. The material of these embers is likely to corrode gradually through a long-time use, thus causing dust generation. This is a cause of contamination of semiconductor devices. Accordingly, a highly corrosion-resistant material is desired. Alumina, aluminum nitride, yttria, and the like are known as highly corrosion-resistant material and are Used in semiconductor manufacturing apparatuses. In addition to these materials, PTL 1 discloses a member containing a $SrY_2O_4$ crystalline phase or a $SrYb_2O_4$ crystalline phase as a corrosion-resistant member satisfying the above requirement. The etching rate of these corrosion-resistant members can be lower than those of $Y_2O_3$ and $Al_2O_3$.

CITATION LIST

Patent Literature

PTL 1: International Publication No. WO2011/122376

SUMMARY OF THE INVENTION

Unfortunately, semiconductors are being increasingly miniaturized for higher-density integration. A material having a higher resistance to Cl-base plasma than the materials disclosed in PTL 1 is desired.

The present invention is intended to solve the above issue, and a major object of the invention is to provide a ceramic material that is more corrosion-resistant to Cl-based plasma than ever before.

The present inventors found that when a ceramic material was produced by thermally spraying a complex oxide, such as $SrY_2O_4$, as the thermal spray material onto a predetermined substrate, the resulting ceramic material exhibited a higher corrosion resistance to Cl-based plasma than known ceramic materials, and thus accomplished the present invention.

A ceramic material of the present invention contains a crystalline phase of a complex oxide containing a Group II element M and a rare earth element RE. The Group II element M is Sr, Ca, or Ba. An XRD diagram of the ceramic material shows a first new peak between peaks derived from the (040) and the (320) plane of $MRE_2O_4$.

A semiconductor manufacturing apparatus member according to the present invention is covered with the ceramic material, A Method for manufacturing a ceramic material, according to the present invention includes preparing a Material containing $MRE_2O_4$ or a material capable of reacting in thermal spray flame to produce $MRE_2O_4$ as a thermal spray material, and thermally spraying the thermal spray material onto a predetermined object.

The ceramic material of the present invention exhibits a higher corrosion resistance to Cl-based plasma than ever before. An XRD diagram of the ceramic material shows a first new peak between the peaks of the (040) and the (320) plane of $MRE_2O_4$. This suggests that the ceramic material contains a complex oxide other than $MRE_2O_4$. The presence of this complex oxide presumably enables the ceramic material to have a higher corrosion resistance to Cl-based plasma than $MRE_2O_4$.

According to the method of the present invention, the above-described ceramic material can be produced. More specifically, M of $MRE_2O_4$ is partially volatilized by being exposed to a thermal spraying environment at an ultra-high temperature and, in addition, melted $MRE_2O_4$ having a high-temperature is rapidly cooled. Such a thermodynamically non-equilibrium condition presumably produces a crystalline phase other than $MRE_2O_4$. The first new peak is probably derived from this crystalline phase.

DETAILED DESCRIPTION OF THE INVENTION

A ceramic material according to the present invention includes a crystalline phase of a complex oxide containing a Group II element M and a rare earth element RE,
  wherein the Group II element M is Sr, Ca, or Ba, and
  wherein an XRD diagram of the ceramic material shows
    a first new peak between peaks derived from the (040) plane and the (320) plane of $MRE_2O_4$.

The peaks of the (040) and the (320) plane of $MRE_2O_4$ are merely used as references to determine the angle of the first new peak. Hence, the ceramic material of the present invention does not necessarily contain a $MRE_2O_4$ crystalline phase.

The Group II element M is Sr, Ca, or Ba, and is preferably Sr. The rare earth element RE is preferably Y, Sc, La, Pr, Nd, Sm, Eu, Gd, Tb, Dy, Ho, Er, Tm, Yb, or Lu, and is More preferably Y, Er, or Yb. The first new peak shown between the peaks of the (040) and the (320) plane of $MRE_2O_4$ in the XRD diagram is derived from an oxide other than $MRE_2O_4$. The XRD diagrams used herein were obtained using $CuK\alpha$ radiation.

The XRD diagram of the ceramic material of the present invention may show a second new peak, as well as the first new peak, between the peaks of the (410) and the (311) plane of $MRE_2O_4$. The second new peak is also derived from an oxide other than $MRE_2O_4$. The first and the second new peak may be derived from the same oxide or different oxides.

The ceramic material of the present invention may contain a $MRE_2O_4$ crystalline phase. Whether or not the ceramic material contains a $MRE_2O_4$ crystalline phase can be determined by whether or not the XRD diagram shows a peak derived from the $MRE_2O_4$ crystalline phase. This determination can be objectively and easily made using a commercially available software program.

In the ceramic material of the present invention, the ratio (A)/(B) of the intensity (A) of the first new peak to the intensity (B) of the peak derived from the (320) plane of $MRE_2O_4$ is preferably larger than 0.8. This is because such a material is corrosion-resistant to Cl-based plasma. The intensity of a peak refers to the height of the peak in the XRD diagram. Peak height can be objectively and easily determined using a commercially available software program.

Preferably, the M/RE mole ratio obtained from the results of an elemental analysis of the entirety of the ceramic material is less than 0.48, and is more preferably less than 0.42. This is because as the M/RE mole ratio is reduced, the intensity (A) of the first new peak increases and the corrosion resistance increases Preferably, the O/RE mole ratio obtained from the results of an elemental analysis of the entirety of the ceramic material is less than 2.2. This is because as the O/RE mole ratio is reduced, the intensity (A) of the first new peak increases and the corrosion resistance increases.

Preferably, the ceramic material of the present invention has a porosity of 10% or less, more preferably 5% or less. A porosity of higher than 10% is undesirable. In such a case, the intensity of the thermal spray coating film can decrease, or the material can release grains therefrom and cause dust generation. Consequently, a less corrosion-resistant portion of the substrate becomes likely to be attacked by corrosive Cl-based plasma. It is desirable that the porosity be as close to zero as possible. Therefore, there is no lower limit. The porosity of a film can be calculated from the ratio of the area of the pores in the film to the area of the film, obtained by image processing of a cross-sectional photograph of the film. If the true density of the film is known, the porosity of the film may be determined by Arcbimedian method. The porosity can be determined by any method.

The ceramic material may be in any form, but is preferably in the form of a film.

The semiconductor manufacturing apparatus member according to the present invention is covered with the above-described ceramic material of the present invention. The semiconductor manufacturing apparatus member may be for example, a member used in a semiconductor manufacturing apparatus, such as an electrostatic chuck, a susceptor, a heater, a plate, an inner wall member, a monitoring window, a microwave introducing window, or a microwave coupling antenna. Since these members must be excellently corrosion-resistant to Cl-based plasma, the ceramic material of the present invention is suitable.

The ceramic material of the present invention may be manufactured by preparing a material containing $MRE_2O_4$ or a material capable of reacting in thermal spray flame to produce $MRE_2O_4$ as a thermal spray material, and thermally spraying the thermal spray material onto a predetermined object. Preferably, the material containing $MRE_2O_4$ is a material containing $MRE_2O_4$ as the main constituent. The $MRE_2O_4$ content in the material containing $MRE_2O_4$ as the main constituent is preferably 50% by mass or more, more preferably 70% by mass or more, and most preferably 90% by mass or more. $MRE_2O_4$ can be produced by, for example, thermal treatment of a mixture of a compound containing M and a compound containing RE in an air atmosphere. The compound containing m may be an oxide, a carbonate, a chloride, a nitrate, a hydroxide or a sulfide of M. The compound containing RE may be an oxide, a carbonate, a. chloride, a nitrate or a sulfide of RE. The mixture may be prepared by wet mixing or dry mixing. Preferably, the thermal treatment is performed at a temperature of 1000° C. to 2000° C., more preferably 1200° C. to 1600° C. The material capable of reacting in thermal spray flame to produce $MRE_2O_4$ may be a mixture of any of the above-mentioned compounds containing M and any of the above-mentioned compounds containing RE (for example, mixture of MO and $RE_2O_3$ with a mole ratio of 1:1). Although the thermal spraying can be performed by any technique as long as the material can be melted, it may be performed by plasma spraying. Examples of plasma gas include, but are not limited to, argon, helium, nitrogen, hydrogen, and oxygen, and combinations of two or more of these gases. The conditions of the thermal spraying are not particularly limited and are appropriately set according to the material to be sprayed and the object to which the material is sprayed. The object may be any of the above-mentioned semiconductor manufacturing apparatus members, or a ceramic substrate such as a yttria substrate, an alumina substrate, or an AlN substrate.

The present invention is not limited to the above-described embodiment, and it should be appreciated that various embodiments can be applied to the invention within the technical scope of the invention.

EXAMPLES

Experimental examples will now be described. Experimental Examples 1-1 and 1-2, Experimental Examples 2-1, and Experimental Examples 3-1 and 3-2 correspond to Examples of the present invention, and Experiment Examples 4 and 5 correspond to Comparative Examples.

The raw materials used in the Experimental Examples were $SrCO_3$ powder (purity: 99.9% by mass or more), $Y_2O_3$ powder (purity: 99.9% by mass or more), $Er_2O_3$ (purity: 99.8% by mass), and $Yb_2O_3$ powder (purity: 99.8% by mass), which are all commercially available.

Experimental Examples 1 to 3

(Preparation of Thermal Spray Material)

The raw materials, $SrCO_3$ powder, $Y_2O_3$ powder, $Er_2O_3$ powder, and $Yb_2O_3$ powder, were each weight out to the mass percent shown in Table 1, and all the powders weighed out were mixed with water with proportions shown in Table 1. To the resulting mixture was added 0.5% by mass of a dispersant relative to the total mass of the powders. The materials were mixed in a nylon pot containing 20 mm iron-core nylon balls by wet-mixing. The resulting slurry of the mixture was formed into granules by being sprayed with a spray dryer. The granules thus produced are referred to as "SD granules." Then, the granules Were beat-treated at 1400° C. in an air atmosphere. The resulting heat-treated powder was subjected to sieving through a vibration sieve of 75 μm in openings. The powder collected under the sieve was used as a thermal spray material.

(Measurement Items of Thermal Spray Material)
1) XRD Measurement

The crystalline phase of each thermal spray Material was identified with an X-ray diffractometer. The Measurement was performed under the conditions of CuKα, 40 kV, 40 mA, and 2θ=10°-70°, using a sealed tube X-ray diffractometer (D8 ADVANCE manufactured by Bruker AXS).

2) Particle Size Distribution

The particle size distribution of the resulting powder of each of the thermal spray materials was measured. For the measurement, Microtrac MT3300EX II manufactured by Nikkiso was used, and the particle sizes at 10% (D10) and 90% (D90) in cumulative particle size distribution were determined. The results are shown in Table 1.

3) Compositional Analysis

Each of the resulting thermal spray materials was subjected to chemical analysis. After dissolving the raw material, Sr was measured by inductively coupled plasma atomic emission spectrometry, and Y, Er, and Yb were measured by chelate titration. The mass percent of O was calculated by subtracting the mass percent values of Sr and the rare earth element RE from 100% that is the total mass percent. Table 1 also shows the Sr/RE mole ratio of Sr to the rare earth element RE and the O/RE mole ratio of O to the rare earth element RE.

Experimental Examples 1-1, 1-2, 2-1, 3-1, 3-2, 4, and 5

(Formation of Thermal Spray Coating Film)

An aluminum substrate having an arithmetic average surface roughness of Ra>1 μm was prepared as a substrate to be subjected to thermal spraying. The thermal spray materials prepared in Experimental Examples 1 to 3 were each plasma-sprayed onto the substrate in an air atmosphere under the conditions shown in Table 2. For Experimental Examples 1-1 and 1-2, the thermal spray material of Experimental Example 1 was used. For Experimental Example 2-1, the thermal spray material of Experimental Example 2 was used. For Experimental Examples 3-1 and 3-2, the thermal spray material of Experimental Example 3 was used. Thus, thermal spray coating film using the thermal spray material of Experimental Example N (N is an integer) is represented as Experimental Example N-M (M is an integer).

(Formation of Bulk Sample)

For examining the corrosion resistance of the thermal spray materials in a bulk state, bulk samples are formed of the respective thermal spray materials (in Experimental Examples 4 and 5). The same raw material powders as those of the corresponding thermal spray material were weight out to the mass percent of Experimental Example 1 or 2 shown in Table 1, and the raw material powders weighed out were mixed with isopropyl alcohol as a solvent in a nylon pot containing 20 mm iron-core nylon balls for 4 hours by wet-mixing. After mixing, the resulting slurry was removed and dried at 110° C. in a nitrogen stream. Then, the sample was passed through a 30-mesh sieve to yield a mixed powder. The mixed powder was uniaxially pressed into a disk-shaped compact of about 50 mm in diameter and about 10 mm in thickness at a pressure of 100 kgf/cm². The resulting compact was placed in a graphite sintering mold. in this sintering step, the disk-shaped compact was subjected to hot press sintering to yield a bulk sample. The hot press

TABLE 1

| | Formulation Composition | | | | Slurry Mixing Total Mass | | | Particle Size Distribution | | Compositional Analysis | |
|---|---|---|---|---|---|---|---|---|---|---|---|
| | $SrCO_3$ mass % | $Y_2O_3$ mass % | $ER_2O_3$ mass % | $Yb_2O_3$ mass % | of Powders mass % | Water mass % | Crystalline Phase | D10 μm | D90 μm | Sr/RE*¹ Mole Ratio | O/RE*¹ Mole Ratio |
| Experimental Example 1 | 39.5 | 60.5 | 0 | 0 | 33 | 67 | $SrY_2O_4$ | 17 | 52 | 0.50 | 2.1 |
| Experimental Example 2 | 27.8 | 0 | 72.2 | 0 | 40 | 60 | $SrEr_2O_4$ | 32 | 47 | 0.48 | 2.1 |
| Experimental Example 3 | 46.2 | 0 | 0 | 53.8 | 40 | 60 | $SrYb_2O_4$ | 29 | 47 | 0.50 | 2.2 |

*¹RE is Y, Er, Yb according to each Experimental Example.

(Evaluation of Thermal Spray Material)

Figure 1:
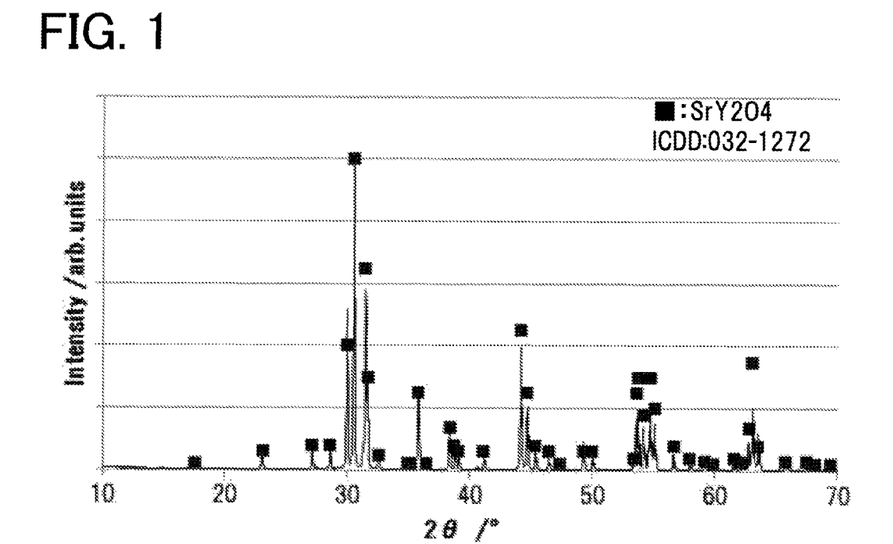
FIG. 1 is an XRD diagram of the thermal spray material of Experimental Example 1.
Figure 2:
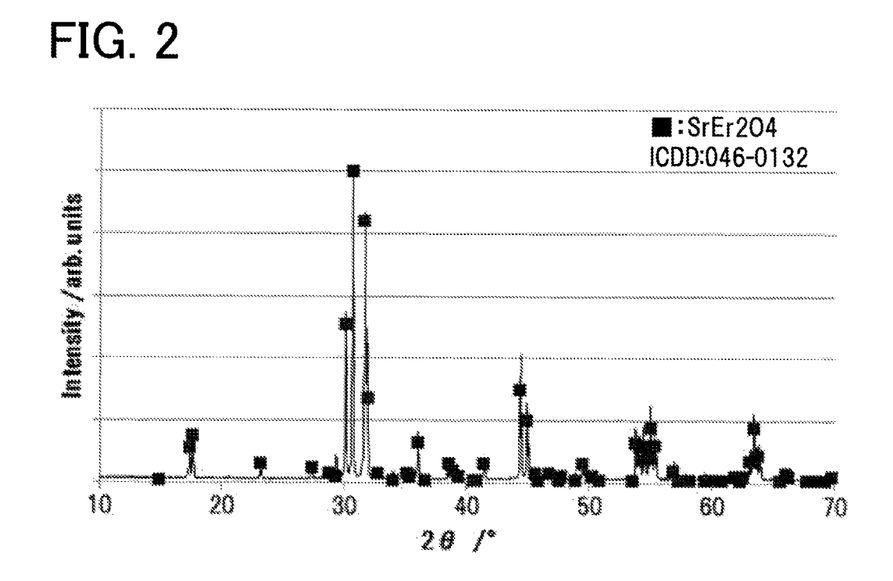
FIG. 2 is an XRD diagram of the thermal spray Material of Experimental Example 2.
Figure 3:
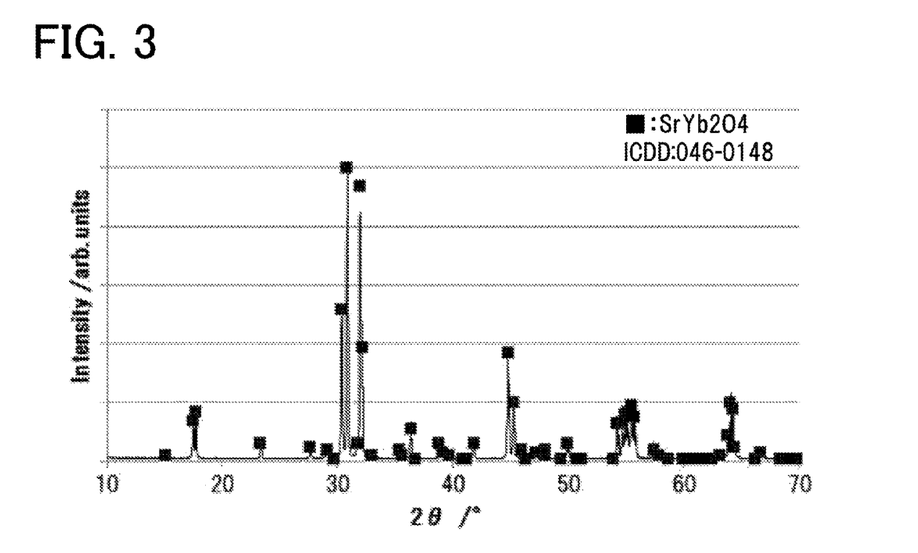
FIG. 3 is an XRD diagram of the thermal spray material of Experimental Example 3.

The XRD measurement results of thermal spray materials of Experimental Examples 1 to 3 are shown in FIGS. 1 to 3. FIGS. 1 to 3 show that the crystalline phases correspond to ICDD Nos. 032-1272, 046-0132, and 046-0148 and are hence a $SrY_2O_4$ single phase, a $SrEr_2O_4$ single phase, and a $SrYb_2O_4$ single phase, respectively. This is supported by compositional analysis results. More specifically, the Sr/RE mole ratio of Sr to rare earth element RE was about 0.5 as with the Sr/RE mole ratios of $SrY_2O_4$, $SrEr_2O_4$, and $SrYb_2O_4$ identified by XRD analysis. Also, the O/RE mole ratio of O to rare earth element RE was about 2 in each Experimental Example.

sintering was performed at a pressing pressure of 200 kgf/cm² and a maximum temperature (sintering temperature) of 1600° C. in an Ar atmosphere, which was kept until completing the sintering. The sintering temperature was kept for 4 hours.

(Measurement Items of Thermal Spray Coating Films and Bulk Samples)
1) XRD Measurement The resulting thermal spray coating film was removed from the substrate and then crushed into powder in a mortar. The bulk sample was also crushed into powder in the same manner. The measurement was performed under the conditions of CuKα, 40 kV, 40 mA, and 2θ=10°-70°, using a sealed tube X-ray diffractometer (D8 ADVANCE manufactured by Bruker AXS). The measurement was performed at a step width of 0.02°. Table 2 shows the composition of each thermal spray coating film, the first new peak intensity (A), and the peak intensity (B) of the (320) plane of $MRE_2O_4$.

2) Compositional Analysis

The resulting thermal spray coating film was removed from the substrate and then crushed into powder in a mortar. After dissolving the powder, Sr was measured by inductively coupled plasma atomic emission spectrometry, and Y, Er, and Yb were measured by chelate titration. The mass percent of O was calculated by subtracting the mass percent values of Sr and the rare earth element RE from 100% that is the total mass percent. Table 2 also shows the Sr/RE mole ratio of Sr to the rare earth element RE and the O/RE mole ratio of O to the rare earth element RE.

3) Porosity

The thermal spray coating film was covered with a resin (epoxy resin) to fill the pores in the thermal spray coating film with the resin, and the thermal spray coating film was cut to expose a section thereof. Then, an SEM image of the section was taken with an SEM (scanning electron microscope). The SEM image was taken at a magnification of 500 times with 712×532 pixels. The resulting image was converted into a 16-bit gray scale image by an image processing software program (Image-Pro Plus 7.0J manufactured by Media Cybernetics) (for scaling by multiplication) and subsequently binarized to obtain the porosity of the coating film. The threshold for binarization was set using Otsu's binarization method as discriminant analysis. For the bulk samples, the porosity was measured by Archimedian method using pure water as the medium. The results are shown in Table 2.

4) Constituent Elements

The section of each of the thermal Spray coating films of Experimental Examples 1-1, 2-1, and 3-1 was covered with an epoxy resin while air bubbles were removed by evacuation. After the epoxy resin was solidified, the section was mirror-polished, and constituent elements were detected and identified with an EPMA.

5) Corrosion Resistance Test

The surface of the resulting thermal spray coating film was mirror-polished and examined for corrosion resistance with a mask partially covering the coating film under the following conditions in an IC plasma corrosion resistance test apparatus. The difference in height between the portions of the surface covered with the mask and the exposed portions of the surface was measured with a step meter. The etching rate of each material was calculated by dividing the difference in height between the masked surface and the exposed surface by time. The results are shown in Table 2.

ICP: 800 W; bias: 300 W; introduced gas: $Cl_2/Ar$=300/140 sccm 0.06 Torr exposure time: 5 h; sample temperature: room temperature

TABLE 2

| | Plasma-sprayed Condition | | | Thermal Spray Coating Film or Bulk Sample | | | | | | |
|---|---|---|---|---|---|---|---|---|---|---|
| | Electric | Introduced Gas | | | Intensity (A) of First | Intensity (B) of Peak Derived | Ratio of Peak | Compositional Analysis | | Etching |
| | Current A | Ar L/min | $H_2$ L/min | Crystalline Phase | New Peak counts | from (320) Plane of $MRE_2O_4$ counts | Intensity (A)/(B) | Sr/RE*[1] Mole Ratio | O/RE*[1] Mole Ratio | Rate μm/h | Porosity % |
| Experimental Example 1-1 | 600 | 41 | 14 | Unknown, $SrY_2O_4$ | 7146 | 3267 | 2.2 | 0.30 | 1.8 | 0.11 | 5 |
| Experimental Example 1-2 | 600 | 50 | 5 | Unknown, $SrY_2O_4$ | 4472 | 5288 | 0.85 | 0.38 | 2.0 | 0.11 | 4 |
| Experimental Example 2-1 | 600 | 41 | 14 | Unknown, $SrEr_2O_4$ | 9069 | 4143 | 2.2 | 0.29 | 1.8 | 0.12 | 5 |
| Experimental Example 3-1 | 600 | 41 | 14 | Unknown | 9954 | —*[2] | ∞ | 0.27 | 1.9 | 0.082 | 4 |
| Experimental Example 3-2 | 600 | 50 | 5 | Unknown | 10983 | —*[2] | ∞ | 0.41 | 2.1 | 0.15 | 4 |
| Experimental Example 4 | | | | $SrY_2O_4$ | | | | | | 0.13 | <1 |
| Experimental Example 5 | | | | $SrEr_2O_4$ | | | | | | 0.17 | <1 |

*[1]RE is Y, Er, or Yb according to each Experimental Example.
*2: "—" indicates that a peak was not observed.

(Evaluation of Thermal Spray coating Films and Bulk Samples)

1) XRD Measurement

Thermal Spray Coating Films

Figure 4:
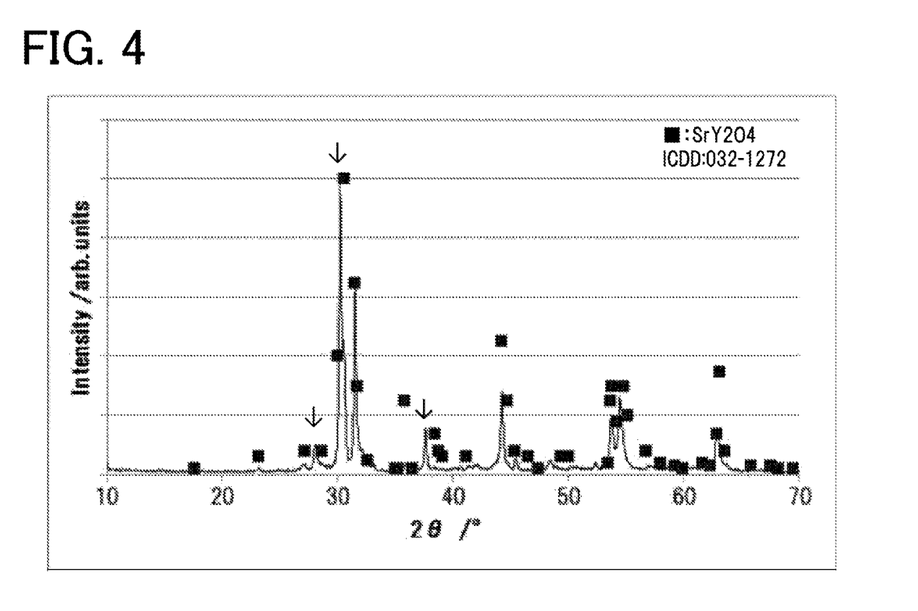
FIG. 4 is an XRD diagram of the thermal spray coating film of Experimental Example 1-1.
Figure 5:
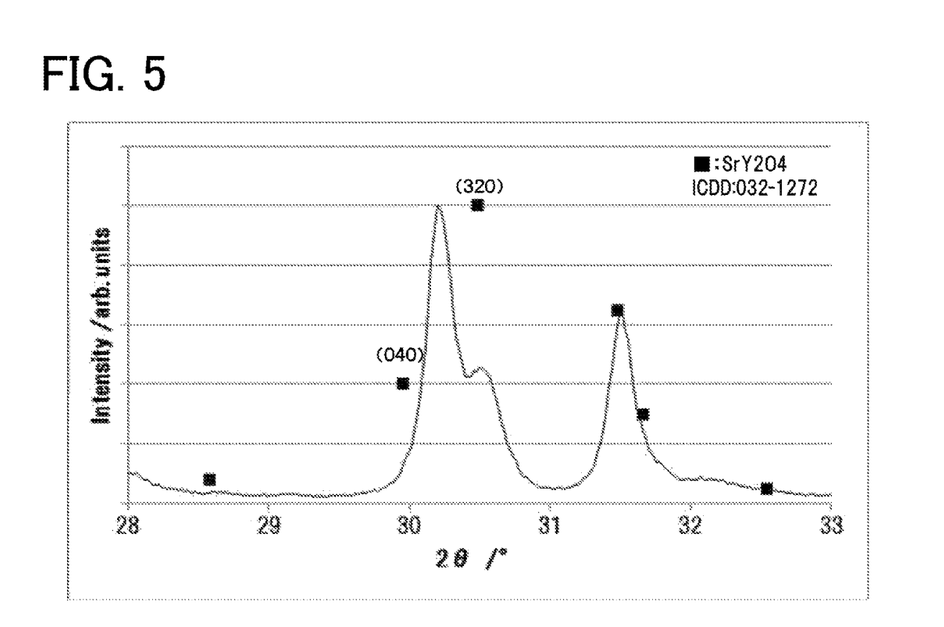
FIG. 5 is an enlarged view of the portion of the XRD diagram shown in FIG. 4 in the range of $2\theta=28°$ to $33°$.
Figure 6:
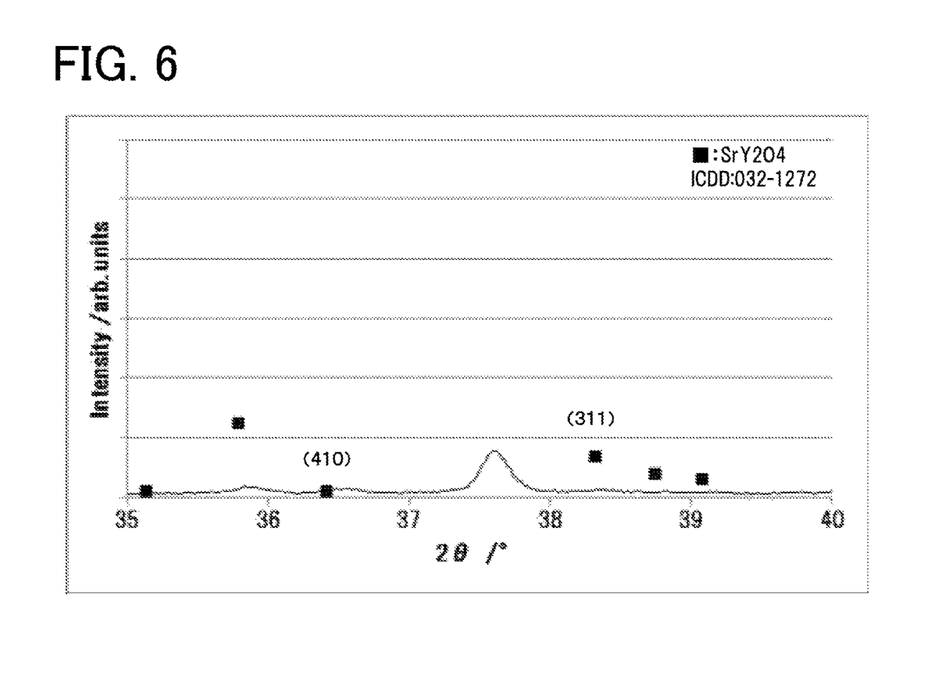
FIG. 6 is an enlarged view of the portion of the XRD diagram shown in FIG. 4 in the range of $2\theta=35°$ to $40°$.
Figure 7:
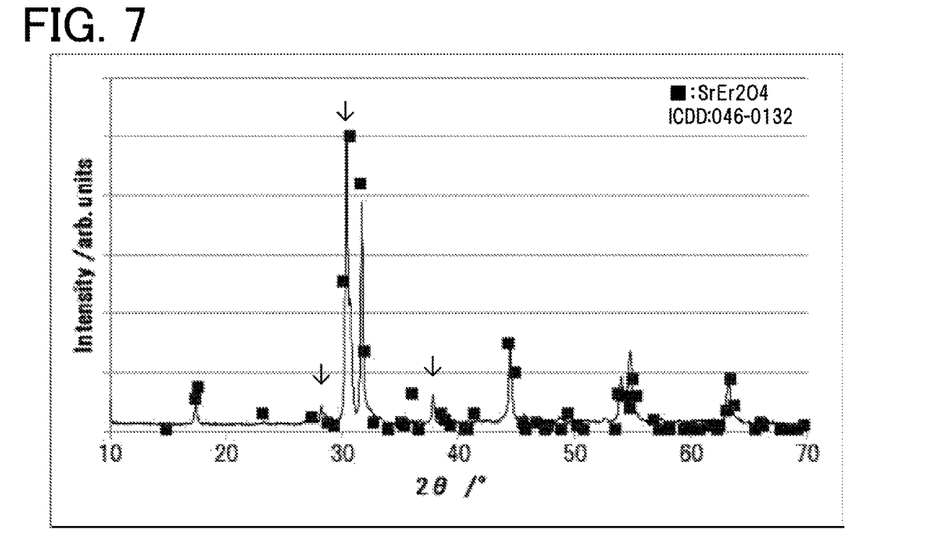
FIG. 7 is an XRD diagram of the thermal spray coating film of Experimental Example 2-1.
Figure 8:
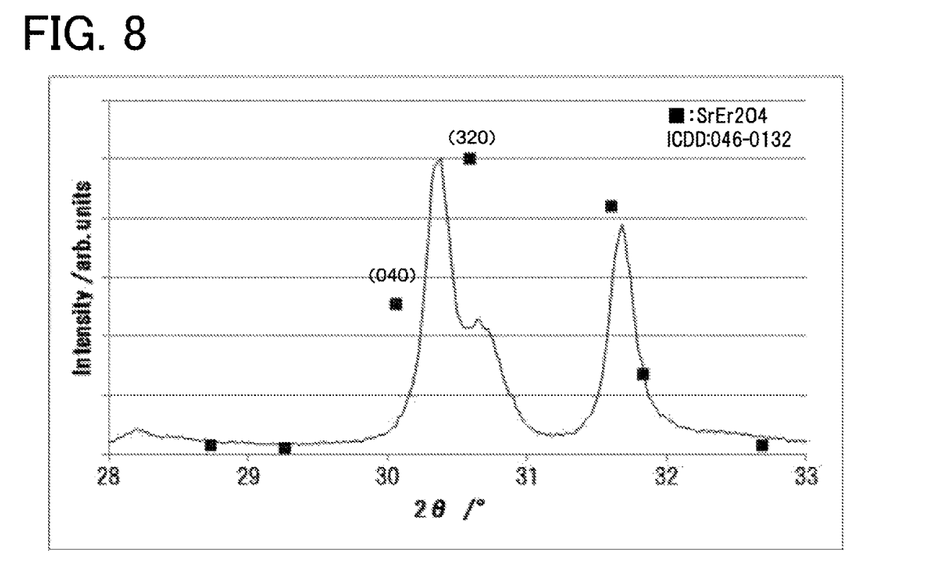
FIG. 8 is an enlarged view of the portion of the XRD diagram shown in FIG. 7 in the range of $2\theta=28°$ to $33°$.
Figure 9:
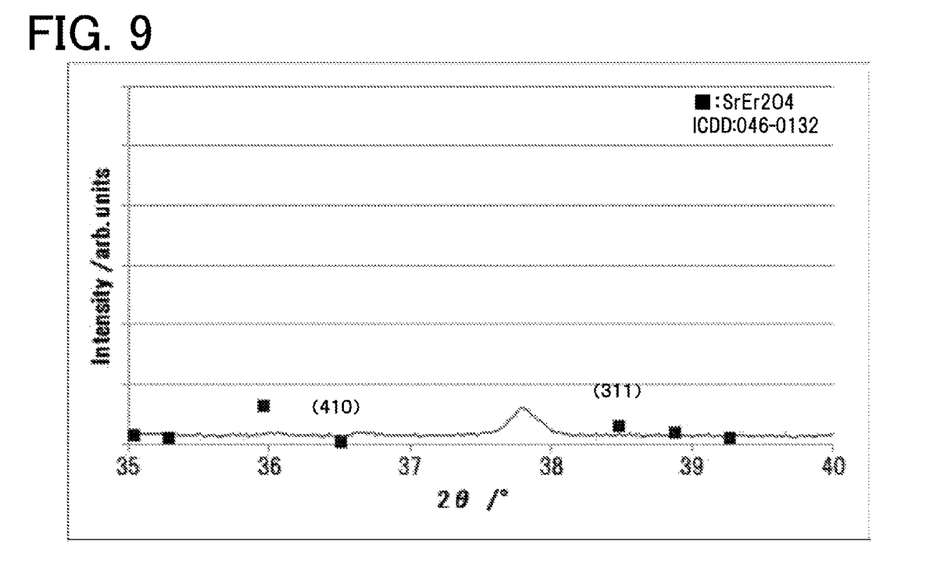
FIG. 9 is an enlarged view of the portion of the XRD diagram shown in FIG. 7 in the range of $2\theta=35°$ to $40°$.
Figure 10:
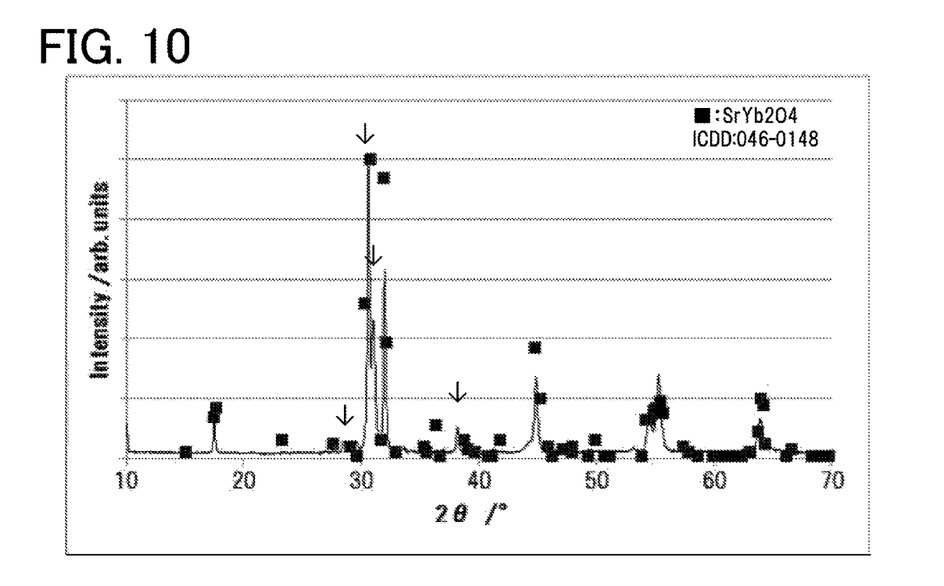
FIG. 10 is an XRD diagram of the thermal spray coating film of Experimental Example 3-1.
Figure 11:
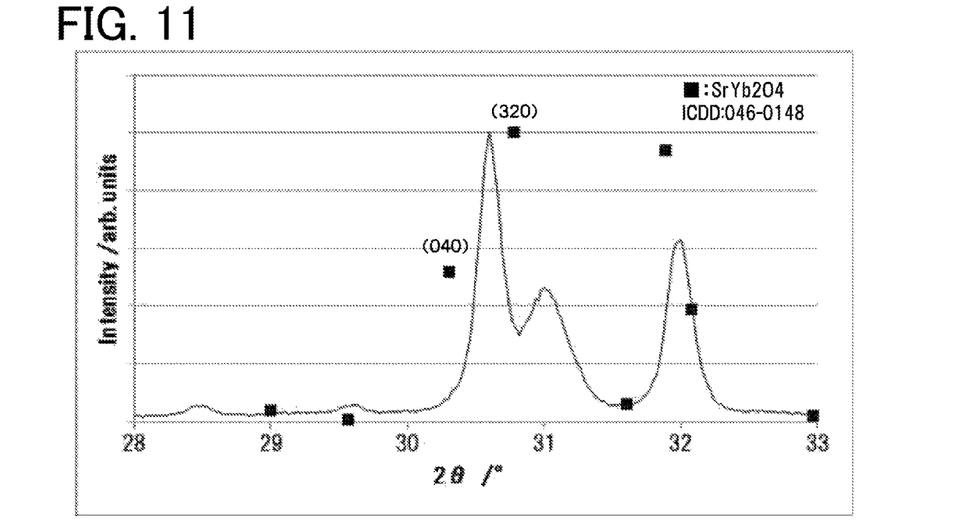
FIG. 11 is an enlarged view of the portion of the XRD diagram shown in FIG. 10 in the range of $2\theta=28°$ to $33°$.
Figure 12:
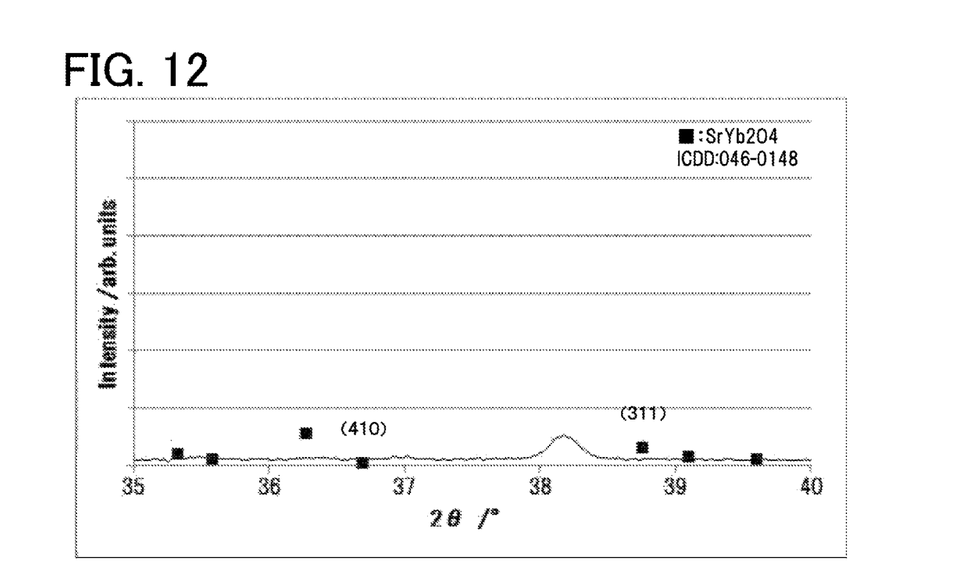
FIG. 12 is an enlarged view of the portion of the XRD diagram shown in FIG. 10 in the range of $2\theta=35°$ to $40°$.

The XRD diagrams of the thermal spray Coating films of Experimental Examples 1-1, 2-1, and 3-1 are shown in FIGS. 4 to 12 as representatives of the thermal spray coating films formed of any one of the thermal spray materials of Experimental Examples 1 to 3. FIGS. 4 to 6 are XRD diagrams of Experimental Example 1-1; FIGS. 7 to 9 are XRD diagrams of Experimental Example 2-1; and FIGS. 10 to 12 are XRD diagrams of Experimental Example 3-1.

As is clear from FIG. 4, the thermal spray coating film of Experimental Example 1-1 contained $SrY_2O_4$ that was the same as the thermal spray material and, in addition, a new crystalline phase other than the thermal spray material as indicated by the downward arrow (↓) in FIG. 4. Whether or not $SrY_2O_4$ remained in the coating film was determined according to the judgment of a commercially available software program JADE7 manufactured by MDI. In particular, as shown in FIG. 5, a strong first new peak was detected between the peaks of the (040) plane (at 2θ=29.961° according to ICDD No. 032-1272) and the (320) plane (at 2θ=30.484° according to ICDD No. 032-1272) of the thermal spray material $SrY_2O_4$, and the intensity (A) of the first new peak was higher than the peak intensity (B) of the (320) plane of $SrY_2O_4$. Also, as shown in FIG. 6, a strong second new peak was detected between the peaks of the (410) plane (at 2θ=36.419° according to ICDD No. 032-1272) and the (311) plane (at 2θ=38.320° according to ICDD No. 032-1272) of $SrY_2O_4$. Table 2 shows the (A)/(B) ratio of these peak intensities. The (A)/(B) ratio in Experimental Example 1-1 was 1 or more. It was confirmed that the first new peak between the peaks of the (040) plane and the (320) plane, and the second new peak between the peaks of the (410) plane and the (311) plane can be detected as peaks by the peak search function of the commercially available software program JADE7 manufactured by MDI. The intensity of a peak refers to the height of the peak in the XRD diagram and is represented by the peak top value of the peak.

As is clear from FIG. 7, the thermal spray coating film of Experimental Example 2-1 contained $SrEr_2O_4$ that was the same as the thermal spray material and, in addition, a new crystalline phase other than the thermal spray material as indicated by the downward arrow (↓) in FIG. 7. Whether or not $SrEr_2O_4$ remained in the coating film was determined according to the judgment of a commercially available software program JADE7 manufactured by MDI. In particular, as shown in FIG. 8, a strong first new peak was detected between the peaks of the (040) plane (at 2θ=30.057° according to ICDD No. 046-0132) and the (320) plane (at 2θ=30.596° according to ICDD No. 046-0132) of the thermal spray material $SrEr_2O_4$, and the intensity (A) of the first new peak was higher than the peak intensity (B) of the (320) plane of $SrEr_2O_4$. Also, as shown in FIG. 9, a strong second new peak was detected between the peaks of the (410) plane (at 2θ=36.511° according to TODD No. 046-0132) and the (311) plane (at 2θ=38.479° according to ICDD No. 046-0132) of $SrEr_2O_4$. The (A)/(B) ratio of the peak intensity (A) of the first new peak to the peak intensity (B) of the (320) plane is shown in Table 2. The (A)/(B) ratio in Experimental Example 2-1 was 1 or more.

For the thermal spray coating film of Experimental Example 3-1, a new crystalline phase other than the thermal spray material was produced, as indicated by the downward arrow (↓) in FIG. 10. In particular, as shown in FIG. 11, a strong first new peak was detected between the peaks of the (040) plane (at 2θ=30.309° according to ICDD No. 046-0148) and the (320) plane (at 2θ=30.779° according to ICDD No. 046-0148) of the thermal spray material $SrYb_2O_4$, and the intensity (A) of the first new peak was higher than the peak intensity (B) of the (320) plane of $SrYb_2O_4$. Also, as shown in FIG. 12, a strong second new peak was detected between the peaks of the (410) plane (at 2θ=36.694° according to ICDD No. 046-0148) and the (311) plane (at 2θ=38.762° according to ICDD No. 046-0148) of $SrYb_2O_4$. The XRD diagram of this thermal spray coating film was analyzed using the above-mentioned commercially available software program JADE7 manufactured by MDI. As a result, the thermal spray material $SrYb_2O_4$ did not remain in the thermal spray coating film. Hence, the peak intensity (B) of the (320) plane of the thermal spray material was zero, and the (A)/(B) ratio was infinity ∞.

Although the results of Experimental Examples 1-2 and 3-2 are not shown, new peaks other than the peaks of the corresponding thermal spray material were observed at the same positions as in Experimental Examples 1-1 and 3-1. Hence, new peaks were observed between the peaks of the (040) plane and the (320) plane of the thermal spray material and between the peaks of the (410) plane and the (311) plane of the thermal spray material. These results suggest that the same new crystalline phase as the crystalline phase of Experimental Example 1-1 was produced in Experimental Example 1-2, and that the same new crystalline phase as the crystalline phase of Experimental Example 3-1 was produced in Experimental Example 3-2. The intensity ratio (A)/(B) was 0.85 in Experimental Example 1-2. In Experimental Example 3-2, however, the intensity ratio was infinity ∞ because the peak of the thermal spray material was not observed.

Bulk Sample

Figure 13:
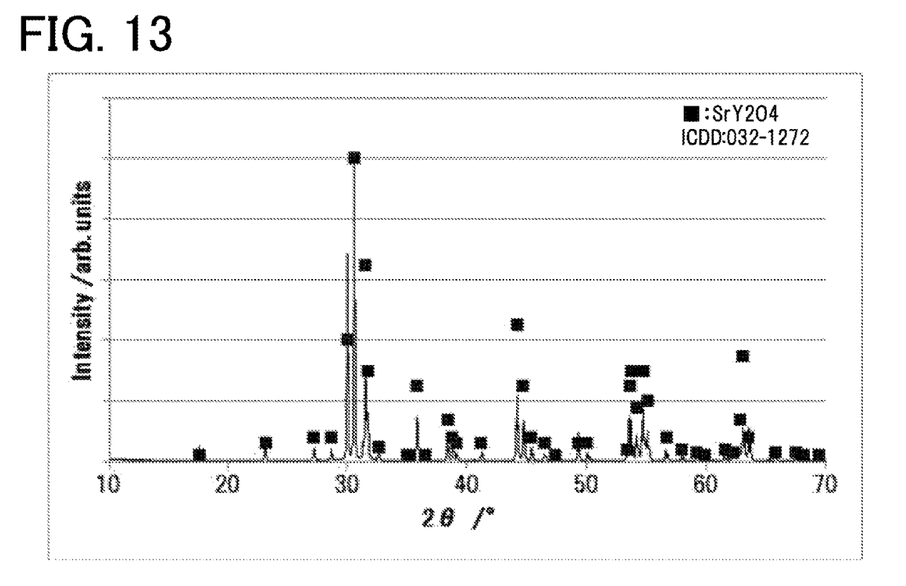
FIG. 13 is an XRD diagram of a bulk sample of Experimental Example 4.
Figure 14:
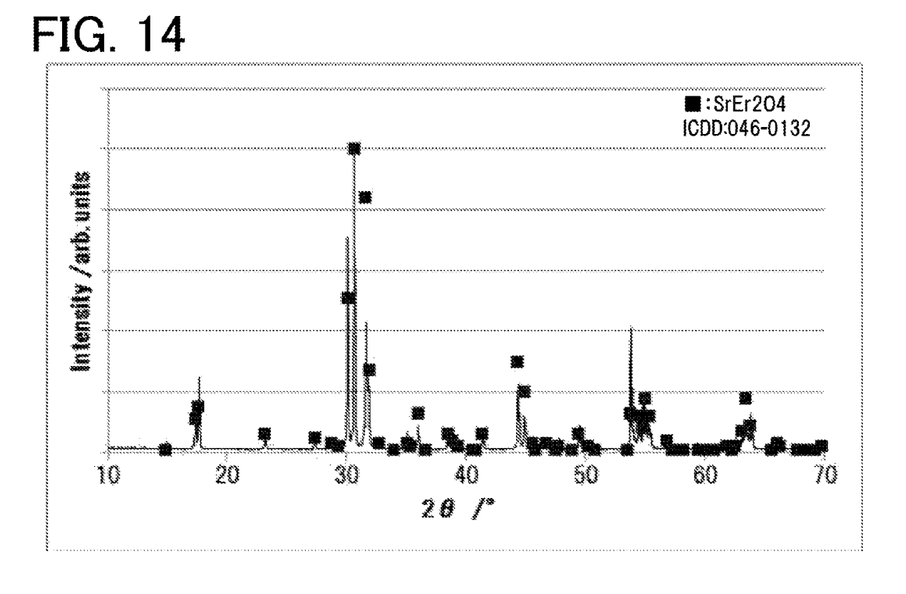
FIG. 14 is an XRD diagram of a bulk sample of Experimental Example 5.

The XRD Measurement results of the bulk samples are shown in FIG. 13 for Experimental Example 4 and in FIG. 14 for Experimental Example 5. FIGS. 13 and 14 show that the crystalline phase of Experimental Example 4 is a $SrY_2O_4$ single phase, and that the crystalline phase of Experimental Example 5 is a $SrEr_2O_4$ single phase.

2) Compositional Analysis

The results of compositional analysis of the thermal spray coating films of Experimental Examples 1-1, 1-2, 2-1, 3-1, and 3-2 are shown in Table 2. It was found that the Sr/RE mole ratio in each of the thermal spray coating films had been reduced from the Sr/RE mole ratio (0.48 to 0.50) in the corresponding thermal spray material. It was also found that the O/RE mole ratio in each of the thermal spray coating films was lower than or equal to the O/RE mole ratio (2.1 to 2.2) in the corresponding thermal spray material. In Experimental Examples 1-1, 1-2, 2-1, 3-1, and 3-2, the thermal spray material exposed to a thermal spraying environment with an ultra-high temperature allows RE or O to partially volatilize therefrom and is also melted. When this melted thermal spray material is rapidly cooled, the material is brought into a thermodynamically non-equilibrium condition. It is assumed that the crystalline phase other than $MRE_2O_4$ was thus produced.

3) Porosity

The porosities of the thermal spray coating film and the bulk sample are shown in Table 2. The porosities of the thermal spray coating films of Experimental Examples 1-1, 1-2, 2-1, 3-1, and 3-2 were each in the range of 4% to 5%. The porosities of the bulk samples of Experimental Examples 4 and 5 were each less than 1%.

4) Structural Elements

From the results of EPMA measurement for Experimental Examples 1-1, 2-1, and 3-1, it was found that the structural elements were mainly Sr, RE, and O. Mapping of Sr, RE, and O was performed. There were a plurality of phases in which the gradient representing the constituent concentration varies among the Sr, RE and O maps. The thermal spray coating films of Experimental Examples 1-1 and 2-1 are each composed of a plurality of phases including a phase of the thermal spray material $SrRE_2O_4$ (Re=Y or Er). These results suggest that a new phase was produced in any of the thermal spray coating films according to the present invention. In the thermal spray coating film of Experimental Examples 3-1, while there was no phase of the thermal spray material $SrYb_2O_4$, it was suggested that a new crystalline phase had been produced.

5) Corrosion Resistance Test

The etching rates of Experimental Examples 1-1, 1-2, 2-1, 3-1, and 3-2 and Experimental Examples 4 and 5 are shown in Table 2. The etching rate of a yttria thermal spray coating film, not shown in Table 2, was 0.16 μm/h. It was found that the thermal Spray Coating films of Experimental Examples 1-1 and 1-2 had higher corrosion resistances to Cl-based plasma than the $SrY_2O_4$ bulk sample of Experimental Example 4, and that the thermal spray coating film of Experimental Example 2-1 had a. higher corrosion resistance to Cl-based plasma than the $SrEr2O_4$ bulk sample of Experimental Example 5.

The present invention is not limited to the above-described experimental examples, and it should be appreciated that various embodiments can be applied to the invention within the technical scope of the invention.

The present application claims priority from Japanese Patent Application No. 2015-149314, filed on Jul. 29, 2015, the entire contents of which are incorporated herein by reference.

What is claimed is:

1. A ceramic material includes a crystalline phase of a complex oxide containing a Group II element M and a rare earth element RE,
   wherein the Group II element M is Sr, Ca, or Ba,
   wherein an XRD diagram of the ceramic material shows a first new peak between peaks derived from the (040) plane and the (320) plane of $MRE_2O_4$, which first new peak is a peak of a ceramic material containing a complex oxide other than $MRE_2O_4$, and
   wherein the M/RE mole ratio obtained from results of an elemental analysis of the entirety of the ceramic material is less than 0.48.

2. The ceramic material according to claim 1,
   wherein the XRD diagram of the ceramic material shows a second new peak between peaks derived from the (410) plane and the (311) plane of $MRE_2O_4$, which second new peak is a peak of a ceramic material containing a complex oxide other than $MRE_2O_4$.

3. The ceramic material according to claim 1, wherein the ceramic material contains a $MRE_2O_4$ crystalline phase.

4. The ceramic material according to claim 1, wherein the Group II element M is Sr, and the rare earth element RE is Y, Er, or Yb.

5. The ceramic material according to claim 1,
   wherein the ratio (A)/(B) of the intensity (A) of the first new peak to the intensity (B) of the peak derived from the (320) plane of $MRE_2O_4$ is larger than 0.8.

6. The ceramic material according to claim 1,
   wherein the O/RE mole ratio obtained from the results of an elemental analysis of the entirety of the ceramic material is 2.1 or less.

7. The ceramic material according to claim 1, wherein the ceramic material has a porosity of 5% or less.

8. A semiconductor manufacturing apparatus member covered with the ceramic material according to claim 1.

9. A method for manufacturing the ceramic material according to claim 1, the method comprising preparing a thermal spray material, the thermal spray material being a material containing $MRE_2O_4$ or a material capable of reacting in thermal spray flame to produce $MRE_2O_4$ and thermally spraying the thermal spray material onto a predetermined object.

10. A ceramic material includes a crystalline phase of a complex oxide containing a Group II element M and a rare earth element RE,
    wherein the Group II element M is Sr, Ca, or Ba,
    wherein an XRD diagram of the ceramic material shows a first new peak between peaks derived from the (040) plane and the (320) plane of $MRE_2O_4$, which first new peak is a peak of a ceramic material containing a complex oxide other than $MRE_2O_4$, and
    wherein the ceramic material has a porosity of 5% or less.

* * * * *